(12) United States Patent
Becker et al.

(10) Patent No.: US 7,891,293 B2
(45) Date of Patent: Feb. 22, 2011

(54) USE OF LASER-ENGRAVED PRINTING FORMS

(75) Inventors: Andreas Becker, Egelsbach (DE); Thomas Rathschlag, Grossostheim (DE); Rüdiger Smolka, Zwingenheim (DE); Edgar Sudhues, Ahaus (DE)

(73) Assignee: Merck Patent Gesellschaft mit beschraenkter Haftung, Darmstadt (DE)

( * ) Notice: Subject to any disclaimer, the term of this patent is extended or adjusted under 35 U.S.C. 154(b) by 265 days.

(21) Appl. No.: 11/416,390

(22) Filed: May 3, 2006

(65) Prior Publication Data

US 2006/0260481 A1 Nov. 23, 2006

(30) Foreign Application Priority Data

May 3, 2005 (EP) ................... 05009671

(51) Int. Cl.
*B41F 31/00* (2006.01)
(52) U.S. Cl. .............. 101/352.13; 101/352.11
(58) Field of Classification Search ............ 101/352.13, 101/352.11, 349.1, 348; 492/30, 31, 33–36, 492/38; 118/212
See application file for complete search history.

(56) References Cited

U.S. PATENT DOCUMENTS

| | | | | |
|---|---|---|---|---|
| 2,456,608 | A * | 12/1948 | Alger | 101/399 |
| 4,200,044 | A * | 4/1980 | Vested | 101/170 |
| 4,553,215 | A * | 11/1985 | Masuda et al. | 430/307 |
| 4,912,824 | A * | 4/1990 | Baran | 492/31 |
| 4,993,320 | A * | 2/1991 | Kochsmeier | 101/148 |
| 5,055,923 | A * | 10/1991 | Kitagawa et al. | 358/534 |
| 5,221,562 | A * | 6/1993 | Morgan | 427/555 |
| 5,416,298 | A | 5/1995 | Roberts | |
| 5,856,648 | A | 1/1999 | Frauchiger et al. | |
| 6,462,307 | B1 | 10/2002 | Hennig et al. | |
| 6,702,885 | B2 | 3/2004 | Schoen et al. | |
| 2005/0069704 | A1 * | 3/2005 | Rathschlag et al. | 428/402.21 |
| 2005/0142292 | A1 | 6/2005 | Schmidt | |
| 2005/0188868 | A1 * | 9/2005 | Beisswenger | 101/401.1 |
| 2006/0225609 | A1 | 10/2006 | Rueger et al. | |

FOREIGN PATENT DOCUMENTS

| | | |
|---|---|---|
| DE | 3711838 A1 | 11/1987 |
| DE | 195 07 827 | 8/1996 |
| DE | 196 12 100 | 10/1997 |
| DE | 10151661 A1 | 5/2003 |

(Continued)

OTHER PUBLICATIONS

Patent Abstracts of Japan, JP-2004-167702, Satoru et al., Gravure Printing Method and Printed Matter, Abstract and detailed explanation.

(Continued)

*Primary Examiner*—Judy Nguyen
*Assistant Examiner*—Leo T Hinze
(74) *Attorney, Agent, or Firm*—Millen, White, Zelano & Branigan, P.C.

(57) ABSTRACT

The present invention relates to the use of laser-engraved printing forms for printing using printing inks in a gravure printing process, where the printing inks are pigmented with flake-form effect pigments, to a corresponding gravure printing process, and to a printing ink.

45 Claims, 2 Drawing Sheets

FOREIGN PATENT DOCUMENTS

| | | |
|---|---|---|
| DE | 102 56 493 | 7/2003 |
| DE | 10259301 | 8/2004 |
| EP | 0398267 | 11/1990 |
| EP | 0960915 | 12/1999 |
| EP | 1 068 923 | 1/2001 |
| JP | 2004-167702 | 6/2004 |
| JP | 2004174932 A | 6/2004 |
| WO | WO 8706724 | 11/1987 |
| WO | WO 92/09399 | 6/1992 |
| WO | WO 96/34718 | 11/1996 |

OTHER PUBLICATIONS

Computer based English translation of Japanese Publication No. 2004174932 A, published Jun. 24, 2004.
Technical data sheet of ECKART published in Apr. 2004.
Technical data sheet of ECKART published in Feb. 2005.
Technical data sheet of ECKART published in May 2004.
German version of the "Handbuch der Printmedien" by Helmut Kippan published in 2001.
English version of the "Handbook of Print Media" by Helmut Kippan published in 2001.
English Abstract of WO 87/06724 the corresponding PCT Application of DE 3711838 A1.
"Consilium The Council of the EU Glossary of Security Documents, Security Features and other related technical terms" obtained from http://www.consilium.europa.eu/prado/EN/glossaryPopup.html on May 3, 2010.
"Viscosity printing" obtained from http://en.wikipedia.org/wiki/Viscosity_printing on Mar. 12, 2010.
"Counterfeit Detection: A guide to spotting counterfeit currency" obtained from http://www.indigoimage.com/count/print.html on Mar. 12, 2010.
"Euro banknote production" obtained from http://www.fleur.decoin.com/eurocoins/banknoteproduction.asp on Mar. 12, 2010.

* cited by examiner

USE OF LASER-ENGRAVED PRINTING FORMS

SUMMARY OF THE INVENTION

The present invention relates to the use of laser-engraved printing forms for printing using printing inks pigmented with flake-form effect pigments inks in a gravure printing process.

Gravure printing processes are highly suitable for the printing of printed matter with long print runs which require very good print quality, for example magazines, consumer-goods packaging, mail-order catalogues and the like. A long print run provides for economical working since the production of the printing form is very expensive compared with other printing processes. The gravure printing process requires as printing form a relief in which the elements to be printed are recessed. The printing form here is either a printing plate or a printing cylinder, the latter being preferred since high printing speeds can be achieved therewith.

Printing forms for gravure printing traditionally are made from copper or have a copper surface. The latter may additionally be chrome-plated, enabling even relatively long runs to be printed without losses of quality.

Recesses, so-called cells, which in most cases correspond to the mirror image of the future print image, were originally etched into the copper surface using acids. These cells take up the printing ink and release it to the print substrate during the subsequent printing operation, in which the printing form is pressed mechanically against the print substrate. The volume of the cells here determines the amount of printing ink transferred to the print substrate.

Etch engraving is an expensive process for the production of the printing form and is in addition associated with high environmental pollution and can only be carried out at relatively low speed.

Etch engraving was replaced virtually completely by electronic engraving some time ago. In the latter, the print image is acquired electronically via a computer and engraved into the metal surface via electronically controlled styluses. This process allows rapid, precise and reliable production of the printing forms and good repeatability of the result if a number of printing forms have to be engraved. However, since the engraving of printing cylinders takes place on the rotating cylinder, variation of the cell diameter or cell depth over the circumference of the printing cylinder with simultaneous adjustment of the screen ruling is not possible, meaning that although specific adaptation to the details of a print image is possible over the width of the cylinder, it is not possible over the circumference of the cylinder. This restricts the usability of electronically engraved printing cylinders with respect to print images to be achieved with fine shadows and/or fine print lines.

Due to the shape of the stylus, the electronically engraved cells have shapes which correspond to a pyramid with variable edge lengths. Electronically engraved printing forms are highly suitable for the processing of low-viscosity printing inks for gravure printing which comprise organic dyes or granular or otherwise irregularly shaped colored pigments.

However, electronically engraved printing forms are only of limited suitability for printing using printing inks which comprise flake-form effect pigments. With increasing particle size of the pigments, however, satisfactory print results cannot be achieved using these printing forms. This is attributable to the fact that the emptying speed of the printing ink is reduced due to deposition of the particles on the side surfaces of the cells or blockages at the tip of the pyramids, and the effect pigments often remain in the cell and do not reach the print substrate. This results in unattractive omissions in the print image and difficulties in the print-run behavior of the printing forms.

Laser-engraved printing forms have also been known for a few years.

In indirect laser engraving, the printing form, which has a metallic surface, is coated, in a first process step, with a plastic coating, a thermosensitive lacquer coating or a ceramic coating, which comprises materials which can be evaporated by laser. The print pattern is then engraved into this coating with the aid of a laser beam. The metallic surface is subsequently etched in the areas of the printing form removed by laser by introduction into an acid bath. The coating enveloping the metallic surface of the printing form is either detached here or remains on the printing form. With the aid of this process, the engraving process of gravure printing forms can be accelerated and made more accurate. However, a disadvantage is the remaining treatment in an acid bath. Corresponding processes have been described in DE 195 07 827 and in DE 196 12 100.

Recently, however, a process has also been disclosed in which metallic printing forms for the gravure printing process are engraved directly by laser irradiation. This process is very fast and enables the engraving of cells of variable area and depth directly into a metallic printing form for gravure printing. A description of this process is found in WO 96/34718 and EP 1 068 923.

Processes are also known by means of which printing forms which have a ceramic surface are engraved directly by laser irradiation without the printing form subsequently being treated by etching with acid. In this case, the ceramic coating must be sufficiently thick in order to accommodate the entire cell depth. A suitable apparatus and a process for the production of ceramic-coated printing forms of this type are described in WO 92/09399.

There have to date been no extensive investigations into how the above-described cells engraved indirectly or directly by laser irradiation in gravure printing forms affect the printing behavior of gravure printing inks pigmented with flake-form effect pigments.

DE 102 56 493 describes a thermally activatable coating composition which is heat-sealable and is printed in a gravure printing process using a gravure printing cylinder which has been provided with cells by laser or electron-beam imaging and/or engraving.

After application of the print image by laser, the printing cylinder is etched. The optical properties of the thermally activatable layer here can be influenced by various dyes or pigments, including effect pigments. According to the example, however, the coating composition comprises only a small amount of volatile solvents and no pigments or dyes. Adaptation of the cell shape, size and distribution on the printing cylinder to the type of pigments to be printed in the coating composition is not described.

DE 690 29 955 T2 discloses a gravure printing plate which describes a number of cell groups on the base area, each of which contains nine cells, which are each arranged in groups of three above and below one another and, in order to improve the flow behavior of the printing ink, each contain notched sections in the cell walls, which are intended to facilitate the coalescence of the printing ink between the cells of the nine-membered group. An object of this invention is to improve the ink flow into the shadow areas of the gravure printing plate. The type of pigmentation of the printing ink does not play a role here. The cells are either etched or produced by electronic engraving.

An object of the present invention is to employ laser-engraved printing forms which are particularly suitable for printing using low-viscosity printing inks pigmented with flake-form effect pigments in a gravure printing process and that can result in the formation of sharp, continuous and very fine print lines, high color saturation and clear shading on the print substrate, and that are suitable for printing inks comprising comparatively coarse flake-form pigments, and where the printing forms are preferably not subjected to an etching process.

A further object is to provide a gravure printing process in which the above-mentioned printing forms are employed.

A further object is to provide a printing ink which can be printed in a gravure printing process using the printing forms described above.

In accordance with the present invention, printing forms are used that comprise a flat or cylindrical body with a metallic or ceramic coating which has recesses in the form of cells produced by laser engraving, for printing using printing inks pigmented with at least one flake-form effect pigment inks in a gravure printing process, where at least some of the cells on the metallic or ceramic coating of the printing form are arranged in groups.

Also in accordance with the present invention, a gravure printing process is provided in which the recesses of a printing form, comprising a flat or cylindrical body with a metallic or ceramic coating which has recesses in the form of cells produced by laser engraving, which are filled with a printing ink comprising water and/or an organic solvent or organic solvent mixture, and the excess ink is subsequently removed from the surface of the printing form, after which the printing ink remaining in the cells is transferred to a print substrate by mechanical pressing of the printing form against the latter and is subsequently dried and/or cured, wherein the printing ink comprises at least one flake-form effect pigment, and at least some of the cells on the metallic or ceramic coating are arranged in groups.

Moreover, the present invention provides a printing ink for the gravure printing process described above, where the printing ink comprises at least one flake-form effect pigment which is a pearlescent pigment, an interference pigment, a metal-effect pigment, a liquid-crystal pigment, a structured pigment, or mixtures thereof.

The printing forms used in accordance with the present invention have a flat or cylindrical body with a metallic or ceramic coating which has recesses in the form of cells produced by laser engraving.

The printing forms are either printing plates or printing cylinders. These have a metallic or ceramic coating in which the cells are located.

In a first embodiment, the metallic coating is covered with a plastic coating, a thermosensitive lacquer coating or a ceramic coating into which the print motif is engraved by means of a laser process. This engraving can be carried out by a thermal or non-thermal process. In a thermal process, the plastic, lacquer or ceramic coating applied is partly heated by the laser beam and removed at the desired points by a melting process. However, this may result in undesired fusion at the edges of the laser engraving, resulting in edges with unsharp contours. Preference is therefore given to a non-thermal laser engraving process, in which the power of the laser is matched to the material to be removed in such a way that the latter evaporates without significant fusion. This can be achieved using a UV excimer laser, a frequency-doubled argon ion laser, a frequency-quadrupled neodymium:YAG laser or an infrared neodymium:YAG laser. The metallic coating of the printing form, which generally is made of copper, aluminum or steel, is subsequently subjected to etch treatment by means of an acid at the points in the overlying plastic, lacquer or ceramic coating uncovered by the laser, resulting in recesses in the form of cells on the metallic coating.

During the etch treatment, the coating on the metallic coating of the printing form is either removed (plastic, lacquer) or retained (ceramic), depending on the acid resistance of the material. The printing form can subsequently be treated by conventional cleaning and polishing processes, optionally also by a subsequent chrome-plating process, before it is employed in the gravure printing process according to the invention. This type of laser engraving is known as indirect laser engraving.

The amount of plastic removed or of ceramic determines how fast the acid is able to penetrate into the metallic coating of the printing form during subsequent acid treatment in this process. This enables the depth of the cells and thus their volume to be adjusted. The diameter of the cells can of course likewise be influenced by the laser power set. Using the etching process, however, it is generally only possible to produce dome-shaped cell bases. It is likewise only possible with very great difficulty to obtain different cell depths within a cell group.

The second embodiment of the laser-engraved printing forms is therefore preferred. Here, the cells are laser-engraved directly into the metallic or ceramic coating of the printing form, which in this case forms the surface of the printing form.

The metallic coatings are preferably made of zinc or suitable zinc alloys, since other metals, such as, for example, the copper usually used earlier, are not suitable for direct laser treatment owing to their high thermal conductivity and high enthalpy of evaporation. For metallic surfaces, this process is preferably carried out in accordance with the process steps described in WO 96/34718 and EP 1 068 923.

Ceramic coatings are preferably made of metal nitrides, metal carbides, metal carbonitrides, metal oxides or mixtures thereof. Preference is given to the use of titanium nitride, chromium nitride, aluminum oxide or mixtures thereof. However, it is also possible to employ other suitable ceramic materials which can be specifically melted or evaporated by laser irradiation. A suitable process is described in WO 92/09399.

The direct laser-engraving processes have the advantage that laser-engraved cells, which can be produced with both variable areas and depths and can be provided with various cell-base shapes, can thus be produced very quickly and with high precision. This opens up the possibility of individually adapting all cells, even within a cell group, in base shape, depth and diameter, both over the width and also over the length of the printing form (the circumference in the case of printing cylinders), to the print image to be produced and the type of flake-form effect pigments used in the printing ink.

In the case of direct laser engraving of the printing form, the acid treatment during etching is also superfluous, which has a positive influence on the environmental impact of the process.

The printing forms engraved in direct laser engraving can also be subjected to conventional post-treatments, such as cleaning, degreasing, chrome-plating and polishing.

The printing inks employed in accordance with the present invention comprise at least one flake-form effect pigment. Furthermore, the printing inks comprise at least one solvent selected from water and/or organic solvents or organic solvent mixtures.

Since the printing inks must achieve complete emptying from the cells and rapid subsequent drying in the gravure printing process, they preferably have a high proportion of volatile solvents. This should not be less than an amount of 35% by weight, based on the total weight of the ready-to-print printing ink, and can be up to 85% by weight, based on the total weight of the ready-to-print printing ink.

Organic solvents which can be used are all solvents usually used in gravure printing processes, for example, branched or unbranched alcohols, aromatics or alkyl esters, such as ethanol, 1-methoxypropanol, 1-ethoxy-2-propanol, ethyl acetate, butyl acetate, toluene, etc., or mixtures thereof.

Suitable binders are likewise conventional binders, in particular those based on nitrocellulose, polyamide, acrylic, polyvinylbutyral, PVC, PUR or suitable mixtures thereof, and binders on a UV-curable basis (free-radical or cationically curing).

It is likewise possible to add conventional additives to the gravure printing ink, such as fillers, further non-flake-form colored pigments or dyes, UV stabilizers, inhibitors, flame retardants, lubricants, dispersants, redispersants, antifoams, flow-control agents, film formers, adhesion promoters, drying accelerators, drying retardants, photoinitiators, etc.

The solids content of the printing ink is adjusted here, depending on the printing temperature, printing speed and type of binders, additives and print substrate, in such a way that the viscosity of the printing ink is sufficient to achieve optimum emptying of the printing ink from the cells. This viscosity adjustment is made directly at the printing machine and can be carried out without inventive step on the basis of the printing ink manufacturer's instructions or the expert knowledge of the printer. The viscosity is generally determined by measuring the efflux time at room temperature and a particular relative atmospheric humidity in a standardized flow cup.

The effect pigments employed in the printing ink are, for example, pearlescent pigments, interference pigments, metal-effect pigments, liquid-crystal pigments, structured pigments (for example structured polymer flakes or structured inorganic flakes, optionally with coatings), or mixtures thereof. These effect pigments are built up from one or more layers of materials, if desired different materials, and are in flake form.

These pigments preferably have a flake-form support, which optionally comprises at least one coating of a metal, metal oxide, metal oxide hydrate or mixtures thereof, a metal mixed oxide, sub-oxide or oxynitride, metal fluoride or a polymer.

Pearlescent pigments comprise transparent flakes of high refractive index and exhibit a characteristic pearlescence due to multiple reflection when aligned in parallel. Pearlescent pigments of this type which additionally also exhibit interference colors are known as interference pigments.

Although classical pearlescent pigments, such as $TiO_2$ flakes, basic lead carbonate, BiOCl pigments or nacreous pigments, are naturally also suitable in principle, the effect pigments employed for the purposes of the invention are preferably flake-form interference pigments or metal-effect pigments, which optionally have at least one coating of a metal, metal oxide, metal oxide hydrate or mixtures thereof, a metal mixed oxide, metal sub-oxide, metal oxynitride, metal fluoride or a polymer on a flake-form support.

The metal-effect pigments preferably have at least one metal support or a metal coating.

The flake-form support is preferably made of natural or synthetic mica, kaolin or another phyllosilicate, glass, calcium aluminum borosilicate, $SiO_2$, $TiO_2$, $Al_2O_3$, $Fe_2O_3$, polymer flakes, graphite flakes or metal flakes, such as, for example, aluminum, titanium, bronze, silver, copper, gold, steel or diverse metal alloys.

Particular preference is given to flake-form supports comprising mica, glass, calcium aluminum borosilicate, graphite, $SiO_2$, $Al_2O_3$ or aluminum.

The size of the flake-form support is not crucial per se. The supports generally have a thickness of between about 0.01 and 5 µm, in particular between 0.05 and 4.5 µm. The length or width dimension is usually from about 1 to 500 µm, preferably from 1 to 200 µm and in particular from 1 to 125 µm. They generally have an aspect ratio (ratio of mean diameter to mean particle thickness) of from about 2:1 to 25,000:1, and in particular from 3:1 to 2000:1.

The said dimensions for the flake-form supports in principle also apply to the coated effect pigments used in accordance with the invention, since the additional coatings are generally in the region of only a few hundred nanometers and thus do not significantly influence the thickness or length or width (particle size) of the pigments.

A coating applied to the support is preferably made of metals, metal oxides, metal mixed oxides, metal sub-oxides or metal fluorides and in particular of a colorless or colored metal oxide selected from $TiO_2$, titanium sub-oxides, titanium oxynitrides, $Fe_2O_3$, $Fe_3O_4$, $SnO_2$, $Sb_2O_3$, $SiO_2$, $Al_2O_3$, $ZrO_2$, $B_2O_3$, $Cr_2O_3$, ZnO, CuO, NiO or mixtures thereof. Coatings of metals are preferably of aluminum, titanium, chromium, nickel, silver, zinc, molybdenum, tantalum, tungsten, palladium, copper, gold, platinum or alloys comprising these. The metal fluoride employed is preferably $MgF_2$.

Particular preference is given to effect pigments which have a flake-form support comprising mica, glass, calcium aluminum borosilicate, graphite, $SiO_2$, $Al_2O_3$ or aluminum and at least one coating selected from $TiO_2$, titanium sub-oxides, titanium oxynitrides, $Fe_2O_3$, $Fe_3O_4$, $SnO_2$, $Sb_2O_3$, $SiO_2$, $Al_2O_3$, $MgF_2$, $ZrO_2$, $B_2O_3$, $Cr_2O_3$, ZnO, CuO, NiO or mixtures thereof.

The effect pigments can have a multilayered structure in which a plurality of layers, which preferably are made of the above-mentioned materials and have different refractive indices in such a way that in each case at least two layers of different refractive index are located alternately on the support, where the refractive indices in the individual layers differ by at least 0.1 and preferably by at least 0.3 from one another, are located one above the other on a metallic or non-metallic support. The layers located on the support here may be either colorless or colored, predominantly transparent, semi-transparent or even opaque.

Depending on the support material used and the type of layers applied, the effect pigments obtained are thus also colorless or have a mass tone, or are predominantly transparent, semi-transparent or opaque. Due to the multilayered system on the support, however, they are additionally capable of producing more or less intense and lustrous interference colors.

The so-called LCPs, which comprise crosslinked, aligned, cholesteric liquid crystals, but also polymer or metal flakes known as holographic pigments, can likewise be employed as effect pigments.

The effect pigments described above may be present in the printing ink employed in accordance with the invention individually or as a mixture of two or more. They may likewise be employed in a mixture with organic and/or inorganic dyes or colored pigments and/or also in mixtures with uncoated mica. The proportion by weight of the effect pigments in the printing ink here is generally between about 1 and 35% by weight and preferably between 5 and 25% by weight, based on the total weight of the ready-to-print printing ink.

Effect pigments which can be employed are, for example, the commercially available functional pigments, interference pigments or pearlescent pigments offered by Merck KGaA under the names Iriodin®, Colorstream®, Xirallic®, Miraval®, Ronastar®, Biflair®, Minatec®, Lustrepak®, Colorcrypt®, Colorcode® and Securalic®, Mearlin® from Mearl, metal-effect pigments from Eckart and optically variable effect pigments, such as, for example, Variochrom® from BASF, Chromafflair® from Flex Products Inc., Helicone® from Wacker, holographic pigments from Spectratec and other commercially available effect pigments.

The individual color effects which can be achieved by the effect pigments are not crucial per se for the success of the present invention. Naturally, however, preference is given to the use of effect pigments with which it is possible to achieve visually very attractive print products which cannot be obtained with classical organic or inorganic dyes or colored pigments alone. Thus, lustrous, intense interference colors, metallic effects or print images which exhibit a color play and/or impressive light/dark effects on tilting (optically variable prints) are much sought-after, especially in packaging printing. The sparkle effect of the print images here is often greater the larger the particle size of the effect pigments. Color and luster impressions of this type can only be achieved with flake-form effect pigments.

However, a further prerequisite for a good print result is that the effect pigments flow uniformly out of the cells with the printing ink and are able to align themselves well on the print substrate, since an optimum optical result can only be expected on flat alignment of the pigment flakes on the print substrate.

By contrast, the flake shape and in particular also the particle size (length or width) of the effect pigments very substantially determine the utility of printing inks comprising flake-form effect pigments in the gravure printing process.

It is obvious that printing inks having a content of flake-form effect pigments whose particle size is larger than the diameter of the cells or whose thickness is greater than the depth of the cells on the printing form cannot be processed using this printing form. However, even if the size ratios of cell and effect pigment allow the flake form effect pigments to be accommodated in the cells, printing using effect pigment-containing printing inks is not automatically possible without faults. Thus, tilted pigments projecting outwards are generally removed from the cells again by the ink squeegee (usually a doctor blade), and the emptying behavior of the printing ink is adversely affected by pigment agglomeration in the cell, etc.

Depending on the preferred size fraction and desired color effects (the latter also depend, as already mentioned above, on the particle sizes of the pigments), the particle sizes are often classified for the gravure printing process, for example into pigments having a particle size of from 1 to less than 25 µm, pigments having a particle size of from 1 to less than 60 µm, pigments having a particle size of from 1 to less than 125 µm, pigments having a particle size of from 1 to less than 200 µm and pigments having a particle size of from 10 to less than 500 µm.

The individual fractions thus exhibit a mixture of pigments of different particle sizes which must not exceed or fall below a certain particle size.

Surprisingly, it has now been found that printing inks pigmented with at least one flake-form effect pigment can be printed particularly well in a gravure printing process using printing forms having a flat or cylindrical body with a metallic or ceramic coating which has recesses in the form of cells produced by laser engraving, where at least some of the cells on the metallic or ceramic coating of the printing form are arranged in groups. Preference is given here to the use of printing forms in which the cells are located in a metallic coating.

The individual cells here have a circular cross section and a base which is located at a certain depth in the metallic or ceramic coating of the printing form.

This cell base may, on the one hand, be formed flat and essentially parallel to the surface of the printing form, and, on the other hand, the cell base may also have a dome shape. The base shape is determined by the power and shape of the laser beam with which the engraving of the cells is carried out. As already mentioned above, indirect laser engraving with subsequent etching only enables very substantially dome-shaped cell bases, while both flat and also dome-shaped cell bases can be produced by direct laser engraving.

The depth and diameter of the cells can also be determined by means of the laser power set. The individual cells on the printing forms used in accordance with the present invention have depths of from about 0.1 to 100 µm, diameters of from about 1 to 180 µm, preferably from 20 to 140 µm, and a depth to diameter ratio of from about 0.1 to 2. The latter is particularly noteworthy since cells whose depth is up to twice the cell diameter cannot be produced by the electromechanical engraving process.

In the case of dome-shaped cell bases, the depth is determined at the point of the base which, when measured at an angle of 90°, is furthest away from the surface of the printing form.

It is particularly worthy of emphasis that the diameter and depth of the cells in the case of printing forms produced by laser engraving, and in addition also the shape of the cell bases in the case of directly laser-engraved printing forms, can be set individually for each individual cell on the printing form.

In accordance with the invention, at least some of the cells on the metallic or ceramic coating of the printing form are arranged in group form.

A group here comprises at least two cells. However, the group can also consist of, for example, three, four, five, six, seven, eight, nine, ten, eleven, twelve, etc., cells arranged closely alongside one another. The cells here are preferably arranged in such a way that they give rise to the shape of a polygon which corresponds to the number of cells or the number of cells minus one. Particular preference is given to groups which contain up to nine cells. The cells are particularly preferably arranged in a hexagonal shape which comprises six or seven cells and in the case of seven cells can form the shape of a rosette.

In a first embodiment, these cells are arranged closely alongside one another without the outer edges of the cells touching one another. Group formation is visually clearly evident here in that the separation of the cells in the group from one another is smaller than the separation of each of the cells in the group from an adjacent cell outside the group.

In a second embodiment, the cells in the group are arranged in such a way that the outer edges of in each case at least two cells in the group touch at at least one point, while the outer edges of none of the cells in the group touch an adjacent cell outside the group.

In a third, particularly preferred embodiment, the cells in the group are arranged in such a way that they partly overlap. In this embodiment too, none of the cells in the group touches an adjacent cell outside the group with its outer edge. As also in the other embodiments, the depth of the individual cells here may be different. In particular, the central cell in a group comprising seven cells arranged hexagonally can have a greater depth than the other cells in the group.

The cells arranged in groups may of course also alternate in the horizontal or vertical direction on the printing form at regular or irregular separations with individual laser-engraved cells of the type described above, i.e. the printing form can have cells which are arranged in groups and cells which are not arranged in groups.

It also arises from the variation possibilities for the diameter, the depth and the cell base shape that the printing form has cells which have the same and/or a different base shape, the same and/or a different diameter and the same and/or a different depth.

This choice will be made by the printer in accordance with the desired print image.

It has proven particularly advantageous, irrespective of the particle size of the effect pigments and the diameter, the depth and the base shape of the cells, for the majority, and preferably all, of the cells on the printing form to be in the form of groups, and in particular in the form of hexagonal groups having six or seven cells.

Significant increases in quality in the form of full-color jobs with high color saturation, good halftone-values and clean and fine line structures in details can thus be obtained, both in area printing and also in detail printing.

This applies equally to print substrates with low and high absorbency, for example films and tissue material. The flake-form effect pigments in the printing inks align well on the print substrate and are able to show their optical properties, such as metal, luster or special color effects, to best advantage. Even fine lines are formed smoothly and with continuous pigmentation without the sawtooth effects which used to be usual in the gravure printing process.

It is not possible to explain precisely what mechanism this effect is based on. However, it can be noted that the flow behavior of the printing inks comprising flake-form effect pigments is improved overall if a high proportion of grouped cells, preferably 100% of the cells, is present on the print roll.

It has also been found that a greater cell volume overall provides for a particularly good print result with increasing particle size (length or width) of the effect pigments. This applies both to each individual cell and also to the group.

This increased cell volume can be obtained by various measures, for example by changing the cell base shape from dome-shaped to flat with the same cell depth, by increasing the diameter of the cells, by increasing the depth of the cells or by intermeshing the cells in the group by partial overlapping.

These measures may of course be taken individually or together in various variations.

It has proven particularly advantageous for all the cells within a group to have a flat cell base and the same diameter and for all cell groups located on the printing form to differ merely in the depth of the cells. The depth of the cell group here is regarded as equivalent to the depth of the deepest cell in the group.

The cell groups here can be in each of the three embodiments described above, i.e. not touching one another, touching at least one point, or overlapping one another. These three embodiments may in each case be present alone or in combination of two or three with one another. The most advantageous is the embodiment in which the cells in the group overlap to some extent and in particular the embodiment in which the seven cells overlap to some extent and are in a rosette-like shape. In this arrangement, each of the cells has an essentially flat cell base, but the base shape of the entire group may have a base shape differing from the ideal flat shape owing to the partial overlapping of the individual cells.

In a cell arrangement of this type on the printing form, the amount of printing ink to be transferred within a defined screen ruling is preferably controlled via the depth of the cells, but not via their diameter or the cell base shape.

The cell depth of each individual cell and each cell group here can be varied in very small steps depending on the amount of printing ink to be transferred. Thus, cell depths of 1 μm can be set and can be varied up to 100 μm if desired, but are preferably varied in steps of about 2, about 5 or about 10 μm.

Thus, for example, it can be noted that effect pigments having a particle size of up to less than 25 μm can be printed well in the case of cells having dome-shaped cell bases whose diameter and depth can each be increased or reduced in the same direction (i.e. with increasing diameter the depth also increases) and which are arranged in group form.

If, however, a printing form on which cell groups are present which all have a flat cell base and the same cell diameter and only differ in the cell depth is employed for these effect pigments, halftone-values and fine print lines, in particular, are shown better to advantage. If the cells also partly overlap in the last-mentioned variant, the print success can be improved further.

For average particle sizes up to less than 60 μm, it is likewise possible to use both types of cell group described above. The cell groups which have a flat cell base and the same cell diameter and in which the cell depth increases with increasing amount of printing ink to be transferred should also preferably be recommended here. Even better print results are also obtained here if the cells partly overlap in the last-mentioned variant.

Printing inks which comprise relatively coarse effect pigments having particle sizes of from 1 to less than 125 μm and from 1 to less than 200 μm are, by contrast, no longer printable with satisfactory results using cell groups which have dome-shaped cell bases and diameters and depths increasing or reducing in the same direction. For these particle sizes, the cell groups which have a flat cell base and the same cell diameter in the case of cells overlapping one another and in which the cell depth increases with increasing amount of printing ink to be transferred represent the best embodiment.

For very coarse effect pigments, which cannot be employed in electromechanically engraved printing forms, having a particle size of from 125 to 200 μm and in particular from 125 to less than 500 μm, which are classified, for example, in the size fraction from 10 to less than 500 μm, by contrast, cell groups having flat cell bases and having particularly great depths are advisable, and in particular the hexagonal groups comprising seven cells, which partly overlap and thus run into one another. These cell arrangements can of course also be employed for relatively small particle sizes of effect pigments. However, the latter exhibit a better emptying behavior in the case of the above-mentioned cell arrangements, at least in the case of smooth print substrates.

It goes without saying here that at least on use of cell groups in which the cells are arranged separately from one another, the particle size of the effect pigments may only be at most so large that it is in each case smaller than the diameter of the individual cells. If, by contrast, a hexagonal shape of the group is present, in which six or seven cells at least partly overlap one another, it is also possible to employ printing inks in which the particle sizes of the effect pigments are equal to or greater than the diameters of the individual cells.

The cells are applied to the printing form in the usual screen sizes used in the gravure printing process. Screen sizes of from 10 to 400 lines/cm, in particular from 30 to 100 lines/cm, can be employed.

The present invention also relates to a gravure printing process in which the recesses of a printing form comprising a flat or cylindrical body with a metallic or ceramic coating which has recesses in the form of cells produced by laser engraving are filled with a printing ink comprising water and/or an organic solvent or organic solvent mixture, and the excess ink is subsequently removed from the surface of the printing form, after which the printing ink remaining in the cells is transferred to a print substrate by mechanical pressing of the printing form against the latter and is subsequently dried and/or cured, where the printing ink comprises at least one flake-form effect pigment, and at least some of the cells on the metallic or ceramic coating are arranged in groups.

The printing ink here comprises the ingredients already described above.

The effect pigments are selected in such a way that they have a thickness in the range from about 0.01 to 5 µm, a length or width in the range from about 1 to 500 µm and aspect ratios of from about 2:1 to 25,000:1.

The viscosity of the printing ink is set so that optimum conditions for the filling and emptying of the cells and for the subsequent drying process (evaporation of the solvent) prevail under the desired printing conditions, such as printing temperature and printing speed, and taking into account the various print substrates. This setting is carried out with the expert knowledge of the printer.

The individual process steps of a gravure printing process are known per se. The recesses of a printing form, i.e. a printing plate or printing cylinder, are firstly filled with the liquid printing ink. In the case of printing cylinders, this is generally carried out by dipping into a printing trough which is filled with the printing ink. The excess ink is subsequently wiped off the surface of the printing form, which comprises the raised, non-printing areas of the printing form, by means of a suitable device, which is generally a doctor blade. The printing ink is then only located in the recesses (cells) of the printing form and is transferred to a print substrate by the latter being pressed against the printing form by the exertion of pressure.

The print substrate takes up the liquid printing ink, whose volatile constituents subsequently evaporate (at room temperature or generally by the supply of air and/or heat at elevated temperature). The binder subsequently hardens with the other solid constituents of the printing ink by complete drying and/or crosslinking, it being possible to accelerate the latter by various measures, for example by UV irradiation.

The use according to the invention of printing forms whose cells are produced by laser engraving and are arranged in groups for printing using a printing ink which comprises flake-form effect pigments in a gravure printing process likewise takes place in accordance with the process steps described above.

Due to the arrangement of the cells in the form of groups and the ability to set the diameter, depth and cell base shape of each individual cell individually, the emptying behavior of the pigmented printing ink from the cells can, however, be adjusted so well that less solvent and overall possibly also less printing ink are needed in order to achieve qualitatively excellent print images.

In particular, the flake-form pigments are also no longer separated from the other constituents of the printing ink during emptying of the printing ink from the cell, and pigment agglomerations do not occur either in the cells or on the print substrate. Very fine lines up to a width of 0.04 mm are therefore also obtainable without pigmentation flaws.

Such fine line structures are of major interest for various areas of application, for example for special packaging or for applications in security printing. In security printing in particular, fine lines, for example for bar codes, guilloches or microtexts, have in the meantime become the standard. With the aid of the present invention, it is now possible to be able to obtain these line structures also with effect pigment-containing printing inks.

There is likewise no need to accept restrictions regarding the print substrates which can be used. The gravure printing process according to the invention is equally suitable for printing print substrates, such as papers, boards, wallpapers, laminates, tissue materials, wood, metals, polymeric films, metal foils, or for printing materials which comprise constituents of a plurality of these substances, for example film- or foil-laminated papers. Special papers, such as, for example, banknote papers or papers which contain visible or invisible security features, can also be printed by the gravure printing process according to the invention.

As is generally usual, the print substrates can be subjected to electrostatic pretreatment and/or provided with primary coatings. These include, for example, color or so-called primer coatings. The papers employed can therefore be, for example, uncoated, coated or calendared papers. This likewise applies to other types of print substrate.

Naturally, however, the different absorbency of the print substrate also requires adaptation of the selected cell geometry. As a general rule, it has been found here that, irrespective of the particle size of the flake-form effect pigments, a greater cell volume is advantageous with increasing absorbency of the print substrate. The cell volume can, as already described above, be adjusted by variation of the cell diameter, depth and base shape, individually or in combination with one another.

This applies both to individual cells and also to individual or all cell groups on the printing form.

Thus, for example, good luster and color effects are also evident on the very absorbent tissue materials (serviettes, hygiene papers, etc.) on use of hexagonal cell groups comprising six or seven cells which partly overlap, have a flat cell base and in addition also an increased depth of up to 100 µm, if a printing ink comprising flake-form interference pigments is printed. The same also applies to banknote papers, which are generally very absorbent.

The present invention also relates to a printing ink for printing in a gravure printing process of the type described above, where the printing ink comprises a flake-form effect pigment which is a pearlescent pigment, an interference pigment, a metal-effect pigment, a liquid-crystal pigment, a structured pigment or a mixture thereof.

The corresponding effect pigments and the other constituents of the printing ink have already been described in detail above, and consequently reference is made here to the corresponding text sections.

The present invention can be employed with good success in the printing of high-quality gravure printed matter in high quantity. This is both the classical printed matter, such as magazines and catalogues, labels, decorative foils, wallpapers and advertising materials, and also packaging, for example for foods, cosmetic and tobacco products, pharmaceutical and animal feed products or plastic products, such as tube laminates and the like.

The present invention can also be used for the production of security print products of all types, for example for printing the above-mentioned labels and packaging materials with security features, but also for the production of various security products, such as banknotes, checks, credit cards, shares, passports, identity documents, chip cards, driving licenses, entry tickets, revenue stamps, seals, etc.

The print products produced in this way can subsequently be subjected to the usual finishing techniques, which may comprise, for example, overprint varnishing for protective or aesthetic purposes, but also mechanical after-treatments, such as, for example, calendaring, embossing or lamination.

Due to the highly variable cell geometries, various types and particle sizes of flake-form effect pigments can be printed on print substrates of a very wide variety of types without the special optical advantages of the effect pigments being lost. In particular, the present invention also enables the use in gravure printing processes of flake-form effect pigments which hitherto could not be employed for gravure printing processes owing to their large particle sizes. However, particularly good luster and sparkle effects can be achieved using such coarse effect pigments.

In the case of the use of printing cylinders in accordance with the present invention, it is of particular advantage that any desired variations of screen rulings and cell geometries can be employed both over the circumference and also over the width of the printing cylinder.

The use of the present invention allows both the production of area prints with high color saturation and high visual attractiveness and also particularly fine shaping of flaw-free, very thin print lines and good halftone-values and thus variable color shading.

The present invention is thus highly suitable for producing high-quality and visually very attractive print products by the gravure printing process which could not be obtained using the printing forms which were usual to date by the gravure printing process.

Without further elaboration, it is believed that one skilled in the art can, using the prceeding description, utilize the following invention to its fullest extent. The following specific preferred embodiments are, therefore, to be construed as merely illustrative, and not limitative of the remainder of the disclosure in any way whatsoever.

In the forgoing and in the following examples, all temperatures are set forth uncorrected in degrees Celsius and, all parts and percentages are by weight, unless otherwise indicated

EXAMPLES

Figure 1:
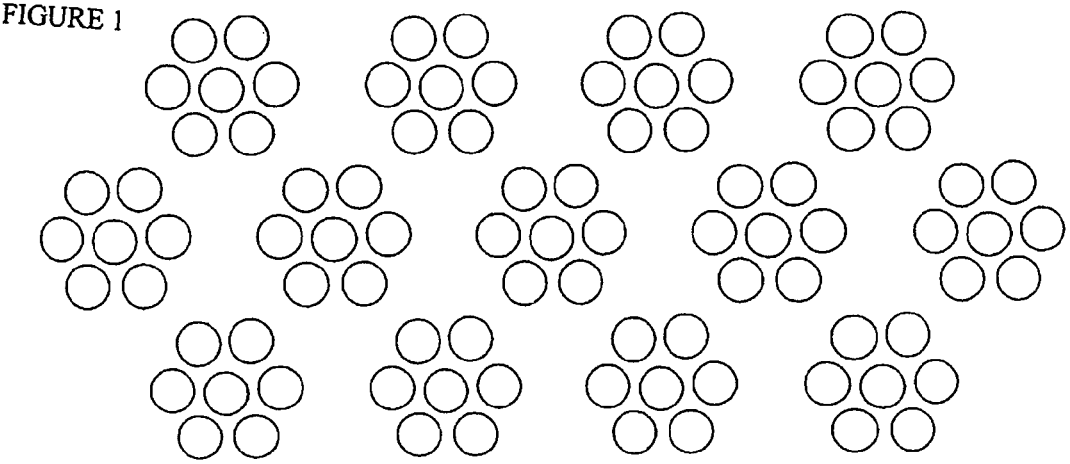
FIG. 1 illustrates an embodiment of the invention wherein the cells are arranged in hexagonal-shaped groups of 7 and each member of the cell group from is separated from the next member of the cell group by a closer distance than each member of the cell group is separated from any member of another cell group, and the cells in each cell group do not touch each other.
Figure 2:
FIG. 2 shows the cross section of cells with of the embodiment of FIG. 1 wherein the cells have either a flat base (left drawing) or a dome base (right drawing).
Figure 3:
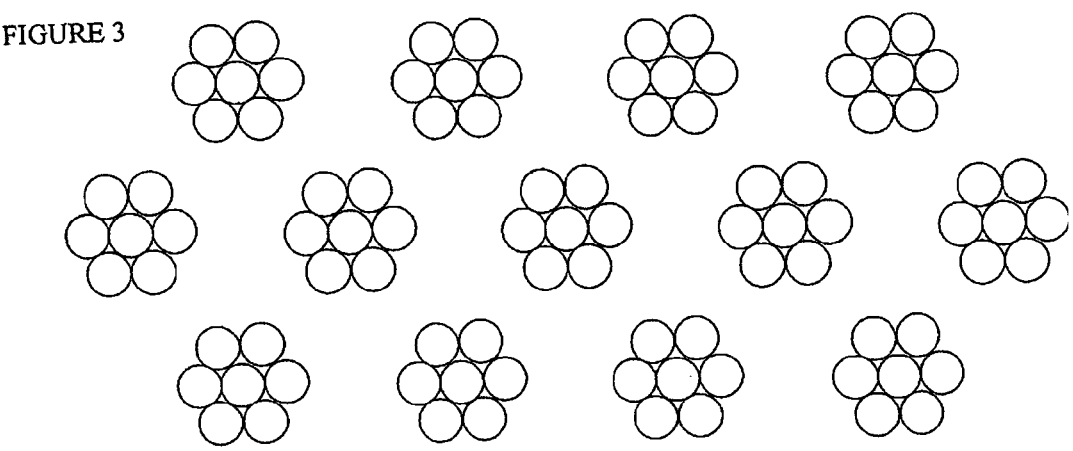
FIG. 3 illustrates an embodiment of the invention wherein the cells are arranged in hexagonal-shaped groups of 7 and each member of the cell group from is separated from the next member of the cell group by a closer distance than each member of the cell group is separated from any member of another cell group, and the cells in each cell group are so close that they touch each other.
Figure 4:
FIG. 4 shows the cross section of cells with of the embodiment of FIG. 2 wherein the cells have either a flat base (left drawing) or a dome base (right drawing).
Figure 5:
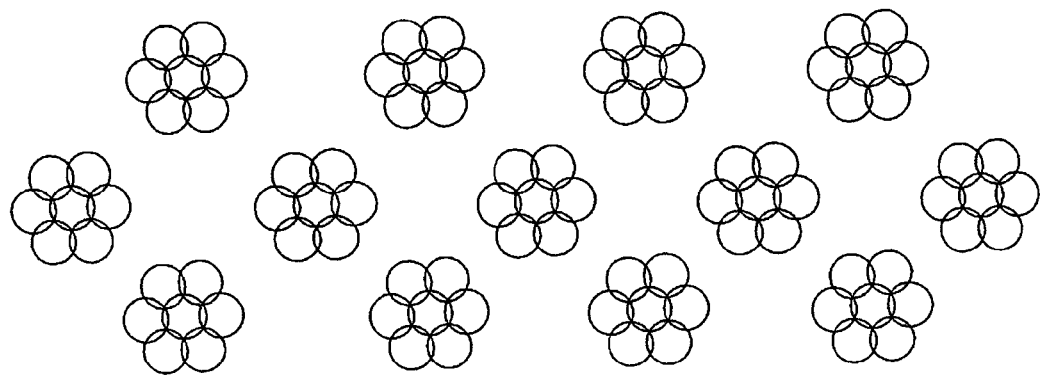
FIG. 5 illustrates an embodiment of the invention wherein the cells are arranged in hexagonal-shaped groups of 7 and each member of the cell group from is separated from the next member of the cell group by a closer distance than each member of the cell group is separated from any member of another cell group, and the cells in each cell group slightly overlap each other.
Figure 6:
FIG. 6 shows the cross section of cells with of the embodiment of FIG. 5 wherein the cells have either a flat base (left drawing) or a dome base (right drawing).
Figure 7:
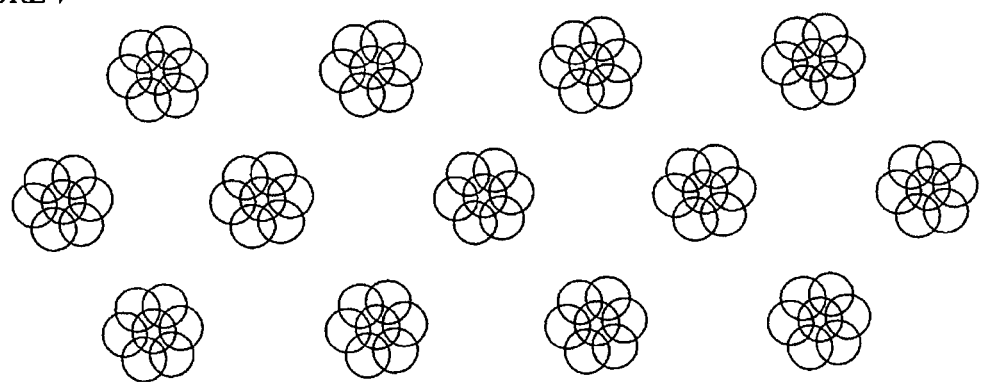
FIG. 7 illustrates an embodiment of the invention wherein the cells are arranged in hexagonal-shaped groups of 7 and each member of the cell group from is separated from the next member of the cell group by a closer distance than each member of the cell group is separated from any member of another cell group, and the cells in each cell group overlap each other to a greater extent than in the embodiment illustrated in FIG. 5.
Figure 8:
FIG. 8 shows the cross section of cells with of the embodiment of FIG. 7 wherein the cells have either a flat base (left drawing) or a dome base (right drawing).

The invention will be explained below with reference to examples.

Example 1

A printing ink which consists of 75 parts by weight of a printing-ink blend comprising binders, additives and solvents (Masterblend 50, 50.36 rotation blend lacquer from Sicpa Aarberg (CH)), 25 parts by weight of a flake-form effect pigment which has a coating of $TiO_2$ (rutile) on an $SiO_2$ flake (Colorstream® Viola Fantasy from Merck KGaA, Darmstadt (DE), particle size 5-50 μm) and 30 parts by weight of a solvent mixture (2:1) of ethoxypropanol and ethanol is printed onto a paper (Algrofiness, 80 g/m², hf, white, coated on one side) at a speed of 100 m/min at a drying temperature of 80° C. using a gravure printing machine of the Moser Rototest (single-color printing machine) type. The printing ink has a viscosity, characterized by the efflux time, of 20 s at 20° C., 60% relative atmospheric humidity, measured in a 4 mm/DIN cup.

The print motif used comprises solid areas and halftone-values with a 10 percent graduation of the ink application from 10 to 100 percent and line structures with line widths of between 0.3 and 0.08 mm. A directly laser-engraved metallic printing cylinder was used. At a screen ruling of 50 lines/cm, this cylinder was provided, for the areas which are intended to produce a full-color print and line motifs on the paper, with cell groups which each consist of seven cells having a diameter of 95 μm each and a depth of 45 μm with a dome-shaped cell base, where the cells partly overlap.

For the areas with which halftone-values are to be achieved, use is made of cell groups each comprising seven cells which partly overlap with 100 percent ink-transfer and have a diameter of 95 μm each and a depth of 45 μm. For the desired reduced ink application to up to 10 percent ink transfer, the cell depth is reduced stepwise to up to 3 μm and the cell diameter to up to 55 μm in 10 steps. In the case of the last-mentioned cell geometry, the individual cells no longer overlap.

A print image is obtained in which the solid area has a uniform ink application with high saturation, the halftone-values are readily evident in each of the 10 graduations and are clearly distinguishable from one another, and the line structures having a line width of between 0.30 and 0.08 mm are well pronounced and visible.

Example 2

A printing ink which consists of 75 parts by weight of a printing-ink blend comprising binders, additives and solvents (Masterblend 50, 50.36 rotation blend lacquer from Sicpa Aarberg (CH)) and 25 parts by weight of a flake-form effect pigment which has a coating of $TiO_2$ (rutile) on an $SiO_2$ flake (Colorstream® Arctic Fire from Merck KGaA, Darmstadt (DE), particle size 5-50 µm) is adjusted using a solvent mixture (1:1) of ethoxypropanol and ethanol in such a way that a viscosity, characterized by the efflux time, of 18 s at 20° C., 60% relative atmospheric humidity, measured in a 4 mm/DIN cup, is obtained.

The printing ink is printed onto a paper (LWC, 60 g/m², white, coated on one side) at a speed of 60 m/min using a GMS single-color gravure printing machine.

The print motif used comprises solid areas and halftone-values with a 10 percent graduation of the ink application from 10 to 100 percent and line structures with line widths of between 0.3 and 0.08 mm.

A directly laser-engraved metallic printing cylinder was used. At a screen ruling of 80 lines/cm, this cylinder was provided, for the areas which are intended to produce a full-color print and line motifs on the paper, with cell groups which each consist of seven cells having a diameter of 50 µm each and a depth of 30 µm with a flat cell base, where the cells partly overlap.

For the areas with which halftone-values are to be achieved, use is made of cell groups of seven cells each which partly overlap with 100 percent ink transfer and have a diameter of 50 µm each and a depth of 30 µm. For the desired reduced ink application to up to 10 percent ink transfer, the cell depth is reduced stepwise to up to 4 µm in 10 steps.

A print image is obtained in which the solid area has a uniform ink application with high saturation, the halftone-values are readily evident from about 40 percent ink application and are clearly distinguishable from one another, and the line structures having a line width of between 0.30 and 0.10 mm are well pronounced and visible.

Example 3

A printing ink which comprises 70 parts by weight of a printing-ink blend comprising binders, additives and solvents (Masterblend 50, 50.36 rotation blend lacquer from Sicpa Aarberg (CH)) and 30 parts by weight of a flake-form effect pigment which has a coating of $TiO_2$ (rutile) on a mica support (Iriodin® 123 (rutile) Bright Luster Satin from Merck KGaA, Darmstadt (DE), particle size 5-25 µm) is adjusted using a solvent mixture (1:1) of ethoxypropanol and ethanol in such a way that a viscosity, characterized by the efflux time, of 18 s at 20° C., 60% relative atmospheric humidity, measured in a 4 mm/DIN cup, is obtained.

The printing ink is printed onto a paper (LWC, 60 g/m², white, coated on one side) at a speed of 60 m/min using a GMS single-color gravure printing machine.

The print motif used comprises solid areas and halftone-values with a 10 percent graduation of the ink application from 10 to 100 percent and line structures having line widths of between 0.3 and 0.08 mm.

A directly laser-engraved metallic printing cylinder was used. At a screen ruling of 80 lines/cm, this cylinder was provided, for the areas which are intended to produce a full-color print and line motifs on the paper, with cell groups which each consist of seven cells having a diameter of 50 µm each and a depth of 30 µm with a flat cell base, where the cells partly overlap.

For the areas with which halftone-values are to be achieved, use is made of cell groups comprising seven cells each which partly overlap with 100 percent ink transfer and have a diameter of 50 µm each and a dept of 30 µm. For the desired reduced ink application to up to 10 percent ink transfer, the cell depth is reduced stepwise to up to 4 µm in 10 steps.

A print image is obtained in which the solid area has uniform ink application with high saturation, the halftone-values are readily evident from about 35 percent ink application and are clearly distinguishable from one another, positive line structures having a line width of between 0.30 and 0.10 mm and negative lines even down to a line width of 0.04 mm are well pronounced and visible.

Example 4

A printing ink which consists of 85 parts by weight of a printing-ink blend comprising binders, additives and water (Folco-Aqua-Flex FT 9002 B from Follmann & Co., Minden (DE)), 15 parts by weight of a flake-form effect pigment which has a coating of $TiO_2$ (rutile) on a calcium aluminum borosilicate flake (Miraval® 5411 Magic White from Merck KGaA, Darmstadt (DE), particle size 20-200 µm) and 7 parts by weight of water is printed onto an untreated wallpaper paper at a speed of 100 m/min and a drying temperature of 80° C. using a gravure printing machine of the Moser Rototest (single-color printing machine) type. The printing ink has a viscosity, characterized by the efflux time, of 20 s at 20° C., 60% relative atmospheric humidity, measured in a 4 mm/DIN cup.

The print motif employed comprises only solid areas.

A directly laser-engraved metallic printing cylinder was used. At a screen ruling of 50 lines/cm, this cylinder was provided on a part-area with cell groups which each consist of seven cells having a diameter of 95 µm each and a depth of 45 µm with a flat cell base, where the cells partly overlap.

A further part-area of the printing cylinder was provided, at a screen ruling of 50 lines/cm, with cell groups which each consist of seven cells having a diameter of 95 µm each and a depth of 90 µm with a flat cell base, where the cells partly overlap.

The areas of the printing cylinder which have cell depths of 45 µm result in weak, but full-area ink application to the wallpaper paper.

In the areas provided with cells having a depth of 90 µm, full ink application is obtained which is readily visible and has a pronounced sparkle effect.

The entire disclosure of all applications, patents, and publications, cited herein and of corresponding European Application No. 05009671.8, filed May 3, 2005 is incorporated by reference herein.

The invention claimed is:

1. A gravure printing process comprising:
applying a low-viscosity printing ink having a proportion of not less than 35% by weight, based on the total weight of the ready-to-print printing ink, of volatile solvent(s), wherein said printing ink is pigmented with at least one flake-form effect pigment onto a print substrate by contacting said print substrate with at least one printing form having recesses filled with said printing ink,
wherein said at least one printing form comprises a flat or cylindrical body with a metallic or ceramic coating having recesses in the form of individual cells produced by laser engraving, wherein at least some of the cells on the metallic or ceramic coating of the printing form are arranged in groups, wherein the arrangement of cells on the metallic or ceramic coating of the printing form into groups comprises:
(a) at least one group consisting of six or seven cells which cells are arranged closely alongside one another without the outer edges of the cells touching one another, and where the separation of the cells in said at least one group from one another is smaller than the separation of each of the cells in said at least one group from an adjacent cell outside said at least one group, and wherein the cells of said at least one group are arranged in a hexagonal shape; and/or
(b) at least one group consisting of six or seven cells which cells are arranged alongside one another in such a way that the outer edges of in each case at least two of the cells in the group touch at least one point, and wherein none of the outer edges of the cells in the group touch an adjacent cell outside the group, and wherein the cells of said at least one group are arranged in a hexagonal shape; and/or
(c) at least one group consisting of six or seven cells which cells arranged in such a way that they partly overlap, and wherein none of the cells in the group touches an adjacent cell outside the group, and wherein the cells of said at least one group are arranged in a hexagonal shape.

2. A process according to claim 1, wherein said at least one printing form is a printing plate.

3. A process according to claim 2, wherein said printing ink comprises a solvent which comprises water, an organic solvent or an organic solvent mixture.

4. A process according to claim 2, wherein said flake-form effect pigment is a pearlescent pigment, an interference pigment, a metal-effect pigment, a liquid-crystal pigment, a structured pigment or a mixture thereof.

5. A process according to claim 2, wherein the effect pigment has a thickness of 0.01 to 5 μm, a length or width of from 1 to 500 μm and an aspect ratio of 2:1 to 25,000:1.

6. A process according to claim 1, wherein said at least one printing form is a printing cylinder.

7. A process according to claim 6, wherein said printing ink comprises a solvent which comprises water, an organic solvent or an organic solvent mixture.

8. A process according to claim 6, wherein said flake-form effect pigment is a pearlescent pigment, an interference pigment, a metal-effect pigment, a liquid-crystal pigment, a structured pigment or a mixture thereof.

9. A process according to claim 6, wherein the effect pigment has a thickness of 0.01 to 5 μm, a length or width of from 1 to 500 μm and an aspect ratio of 2:1 to 25,000:1.

10. A process according to claim 1, wherein said printing ink comprises a solvent which comprises water, an organic solvent or an organic solvent mixture.

11. A process according to claim 10, wherein said printing ink comprises said solvent in an amount of at least 35% by weight, based on the total weight of the printing ink.

12. A process according to claim 1, wherein the printing ink is dried and/or cured at room temperature, at elevated temperature, or by irradiation with UV light.

13. A process according to claim 1, wherein said flake-form effect pigment is a pearlescent pigment, an interference pigment, a metal-effect pigment, a liquid-crystal pigment, a structured pigment or a mixture thereof.

14. A process according to claim 13, wherein said flake-form effect pigment is an effect pigment which comprises a flake-form support with optionally at least one coating of a metal, metal oxide, metal oxide hydrate or mixtures thereof, a metal mixed oxide, sub-oxide or oxynitride, a metal fluoride, or a polymer.

15. A process according to claim 1, wherein the effect pigment has a flake-form support comprising natural or synthetic mica, kaolin or another phyllo-silicate, glass, calcium aluminum borosilicate, $SiO_2$, $TiO_2$, $Al_2O_3$, $Fe_2O_3$, polymer flakes, graphite flakes or metal flakes.

16. A process according claim 1, wherein the effect pigment has a flake-form support comprising mica, glass, calcium aluminum borosilicate, graphite, $SiO_2$, $Al_2O_3$ or aluminum, and at least one coating selected from $TiO_2$, titanium sub-oxides, titanium oxynitrides, $Fe_2O_3$, $Fe_3O_4$, $SnO_2$, $Sb_2O_3$, $SiO_2$, $Al_2O_3$, $MgF_2$, $ZrO_2$, $B_2O_3$, $Cr_2O_3$, ZnO, CuO, NiO and mixtures thereof.

17. A process according to claim 1, wherein the effect pigment has a thickness of 0.01 to 5 μm, a length or width of from 1 to 500 μm and an aspect ratio of 2:1 to 25,000:1.

18. A process according to claim 1, wherein the individual cells of said at least one print form have a circular cross section and a base which is located at a certain depth in the metallic coating of the printing form.

19. A process according to claim 18, wherein the cells have a flat base which is formed essentially parallel to the surface of said at least one printing form.

20. A process according to claim 18, wherein the cells have a dome-shaped base.

21. A process according to claim 18, wherein the cells have a diameter 1 to 180 μm, a depth of 0.1 to 100 μm, and a depth to diameter ratio of 0.1 to 2.

22. A process according to claim 1, wherein the arrangement of cells on the metallic or ceramic coating of the printing form into groups comprises at least one group containing six or seven cells wherein the cells are arranged closely alongside one another without the outer edges of the cells touching one another, and where the separation of the cells in said at least one group from one another is smaller than the separation of each of the cells in said at least one group from an adjacent cell outside said at least one group.

23. A process according to claim 1, wherein the arrangement of cells on the metallic or ceramic coating of the printing form into groups comprises at least one group containing six or seven cells wherein the cells are arranged alongside one another in such a way that the outer edges of in each case at least two of the cells in the group touch at least one point, and wherein none of the outer edges of the cells in the group touch an adjacent cell outside the group.

24. A process according to claim 1, wherein the arrangement of cells on the metallic or ceramic coating of the printing form into groups comprises at least one group containing six or seven cells wherein the cells are arranged in such a way that they partly overlap, and wherein none of the cells in the group touches an adjacent cell outside the group.

25. A process according to claim 1, wherein each group of cells consists of six or seven cells arranged in a hexagonal shape.

26. A process according to claim 1, wherein a group contains seven cells which each have a flat cell base and the same diameter and are arranged in a hexagonal shape.

27. A process according to claim 26, wherein all of the cell groups on the printing form comprise seven cells, each having a flat cell base and the same diameter and are arranged in a hexagonal shape, and wherein the cell groups differ in their depth.

28. A process according to claim 1, wherein the printing form has cells which have the same and/or a different base shape.

29. A process according to claim 1, wherein the printing form has cells which have the same and/or a different diameter.

30. A process according to claim 1, wherein the printing form has cells which have and the same and/or a different depth.

31. A process according to claim 1, wherein the printing form further comprises cells that are not arranged in said at least one group.

32. A process according to claim 1, wherein the print substrate is a paper, a board, a wallpaper, a laminate, a tissue material, wood, metal, a polymeric film, a metal foil, a security print product or a material which comprises constituents of a plurality of these substances, and where the print substrate has optionally been electrostatically pretreated and/or provided with a primary coating.

33. A process according to claim 1, wherein the arrangement of cells on the metallic or ceramic coating of the printing form into groups comprises at least one group containing six or seven cells wherein the cells are arranged in such a way that they partly overlap, and wherein none of the cells in the group touches an adjacent cell outside the group.

34. A gravure printing process using a printing form which comprises a flat or cylindrical body with a metallic or ceramic coating which has recesses in the form of cells produced by laser engraving, wherein said recesses are to be filled with a printing ink, said process comprising:

applying a low-viscosity printing ink having a proportion of not less than 35% by weight, based on the total weight of the ready-to-print printing ink, of volatile solvent(s), wherein said printing ink is pigmented with at least one flake-form effect pigment onto a print substrate by contacting said print substrate with at least one printing form having recesses filled with said printing ink, filling said recesses with a low-viscosity said printing ink, said printing ink comprising water, an organic solvent or organic solvent mixture, and having a proportion of not less than 35% by weight, based on the total weight of the ready-to-print printing ink, of volatile solvent(s), subsequently removing excess ink from the surface of the printing form, transferring the printing ink remaining in the cells to a print substrate by mechanical pressing of the printing form against the latter, and subsequently drying and/or curing said printing ink, wherein said printing ink comprises at least one flake-form effect pigment, and at least some of the cells on the metallic or ceramic surface are arranged in groups, wherein at least some of the cells on the metallic or ceramic coating of the printing form are arranged in groups, and the arrangement of cells on the metallic or ceramic coating of the printing form into groups comprises:

(a) at least one group consisting of six or seven cells which cells are arranged closely alongside one another without the outer edges of the cells touching one another, and where the separation of the cells in said at least one group from one another is smaller than the separation of each of the cells in said at least one group from an adjacent cell outside said at least one group, and wherein the cells of said at least one group are arranged in a hexagonal shape;

(b) at least one group consisting of six or seven cells which cells are arranged alongside one another in such a way that the outer edges of in each case at least two of the cells in the group touch at least one point, and wherein none of the outer edges of the cells in the group touch an adjacent cell outside the group, and wherein the cells of said at least one group are arranged in a hexagonal shape; or (c) at least one group consisting of six or seven cells which cells arranged in such a way that they partly overlap, and wherein none of the cells in the group touches an adjacent cell outside the group, and wherein the cells of said at least one group are arranged in a hexagonal shape.

35. A process according to claim 34, wherein said printing form is a printing plate.

36. A process according to claim 34, wherein said printing form is a printing cylinder.

37. A process according to claim 34, wherein said print substrate is a paper, a board, a wallpaper, a laminate, a tissue material, wood, metal, a polymeric film, a metal foil, a security print product or a material which comprises constituents of a plurality of these substances, and where the print substrate has optionally been electrostatically pretreated and/or provided with a primary coating.

38. A process according to claim 34, wherein the effect pigment has a thickness of 0.01 to 5 µm, a length or width of 1 to 500 µm and an aspect ratio of 2:1 to 25,000:1.

39. A process according to claim 34, wherein said printing ink comprises a flake-form effect pigment which is a pearlescent pigment, an interference pigment, a metal-effect pigment, a liquid-crystal pigment, a structured pigment or a mixture thereof.

40. A process according to claim 34, wherein the arrangement of cells on the metallic or ceramic coating of the printing form into groups comprises at least one group containing six or seven cells wherein the cells are arranged closely alongside one another without the outer edges of the cells touching one another, and where the separation of the cells in said at least one group from one another is smaller than the separation of each of the cells in said at least one group from an adjacent cell outside said at least one group.

41. A process according to claim 34, wherein the arrangement of cells on the metallic or ceramic coating of the printing form into groups comprises at least one group containing six or seven cells wherein the cells are arranged alongside one another in such a way that the outer edges of in each case at least two of the cells in the group touch at least one point, and wherein none of the outer edges of the cells in the group touch an adjacent cell outside the group.

42. A process according to claim 34, wherein each group of cells consists of six or seven cells arranged in a hexagonal shape.

43. A process according to claim 34, wherein the individual cells of said at least one print form have a circular cross section and a base which is located at a certain depth in the metallic coating of the printing form.

44. A process according to claim 43, wherein the cells have a flat base which is formed essentially parallel to the surface of said at least one printing form.

45. A process according to claim 43, wherein the cells have a dome-shaped base.

* * * * *

UNITED STATES PATENT AND TRADEMARK OFFICE
CERTIFICATE OF CORRECTION

| | | |
|---|---|---|
| PATENT NO. | : 7,891,293 B2 | |
| APPLICATION NO. | : 11/416390 | |
| DATED | : February 22, 2011 | |
| INVENTOR(S) | : Becker et al. | |

It is certified that error appears in the above-identified patent and that said Letters Patent is hereby corrected as shown below:

Column 19, line 32 reads "filling said recesses with a low-viscosity said printing ink," should read
-- filling said recesses with a low-viscosity printing ink, --

Signed and Sealed this
Third Day of May, 2011

David J. Kappos
*Director of the United States Patent and Trademark Office*